United States Patent [19]

Nakamura et al.

[11] Patent Number: 4,535,681
[45] Date of Patent: Aug. 20, 1985

[54] FLUID OPERATED TRANSMISSION CONTROL SYSTEM

[75] Inventors: Masaru Nakamura, Matsuto; Takashi Kuse, Komatsu, both of Japan

[73] Assignee: Kabushiki Kaisha Komatsu Seisakusho, Tokyo, Japan

[21] Appl. No.: 614,479

[22] Filed: May 29, 1984

[30] Foreign Application Priority Data

| May 31, 1983 | [JP] | Japan | 58-081047 |
| May 31, 1983 | [JP] | Japan | 58-081048 |
| May 31, 1983 | [JP] | Japan | 58-094878 |
| May 31, 1983 | [JP] | Japan | 58-094880 |

[51] Int. Cl.³ .................... F15B 11/16; F15B 13/06
[52] U.S. Cl. .................... 91/527; 91/529; 91/531
[58] Field of Search .......... 74/752 A, 752 C, 868, 74/869; 192/3.57; 91/529, 527, 530, 531

[56] References Cited

U.S. PATENT DOCUMENTS

| 2,984,985 | 5/1961 | MacMillin | 91/529 |
| 3,631,762 | 1/1972 | Fuzzell | 91/527 |
| 3,817,153 | 6/1974 | Zunzer | 91/529 |
| 4,395,927 | 8/1983 | Müller et al. | 74/869 |
| 4,420,994 | 12/1983 | Müller et al. | 74/869 |

*Primary Examiner*—Paul E. Maslousky
*Attorney, Agent, or Firm*—Frost & Jacobs

[57] ABSTRACT

A hydraulic vehicular transmission has a plurality of drive speed establishing devices (e.g. clutches) to be actuated for selecting a drive speed, and a pair of similar drive direction establishing devices to be actuated for selecting a drive direction. The drive establishing devices are all actuated and deactuated hydraulically by respective solenoid operated control valves via respective pilot operated valves. Since the solenoid valves are susceptible to malfunctioning, as in the event of trouble in the associated electrical circuitry, emergency control valves are interposed respectively between the solenoid valves and the pilot operated valves. Each emergency control valve is to be hand operated in the event of the malfunctioning of the associated solenoid valve for actuating or deactuating the associated speed or direction establishing device via the associated pilot operated valve. Additional features are incorporated for the greater utility of the transmission control system.

8 Claims, 1 Drawing Figure

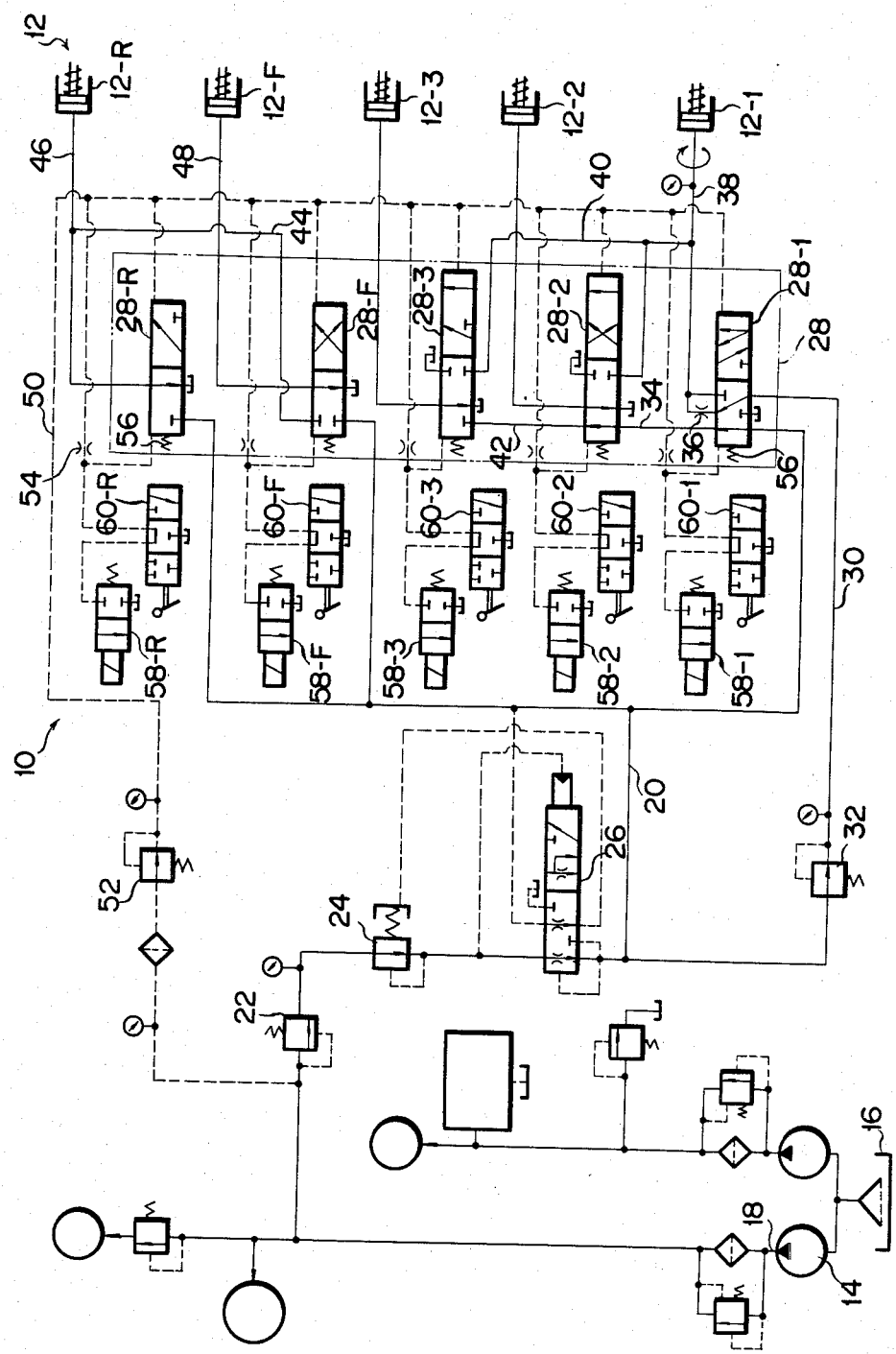

FLUID OPERATED TRANSMISSION CONTROL SYSTEM

BACKGROUND OF THE INVENTION

Our invention relates to fluid operated transmission control systems, and more specifically to a hydraulic control system for an automatic, multispeed vehicle transmission of the kind having drive establishing devices to be selectively actuated by fluid pressure for selecting a drive speed or drive ratio and a drive direction through the transmission.

The hydraulic vehicle transmission is known wherein a group of drive establishing clutches or like devices are selectively pressurized to determine a drive speed, and another group of similar drive establishing devices are selectively pressurized to determine a drive direction (i.e. forward or reverse). Japanese Patent Application No. 54-149942 represents a conventional method of selectively pressurizing the two groups of drive establishing devices under the operator's control. It suggests the use of solenoid valves for pilot operating the speed select valves and direction select valves which selectively place the respective drive establishing devices in communication with a pressurized fluid source and with a fluid drain. An objection to this known transmission control system is that in the event of the malfunctioning of any solenoid valve, the associated speed or direction select valve fails to actuate or deactuate the drive establishing devices. The solenoid valves will malfunction as upon entrapment of foreign matter therein or in the event of a trouble in the electrical circuitry.

Japanese Utility Model Application No. 56-32839 proposes an improvement of the first referenced application. According to this second application the speed select valves and direction select valves are each adapted for direct manual actuation by means of a threaded element in the event of the malfunctioning of the associated solenoid valve. This makes possible the emergency retraction of the vehicle to a safe location or the self transportation of the vehicle to a service shop.

A problem has arisen, however, in connection with the solution proposed by the second recited application. The speed select valves and direction select valves have been so connected as to avoid the simultaneous engagement (double clutching) of any two of the drive speed establishing devices or of the drive direction establishing devices. Consequently, upon malfunctioning of the solenoid for selecting reverse vehicle travel, for instance, it has become impossible to control the reverse drive establishing device. Should such a trouble occur when the vehicle stands on the edge of a cliff, for example, it has stalled there, incapable of backing away from the cliff.

An additional problem with the known transmissions concerns those employing planetary gear trains. The first speed establishing device of some transmissions of this kind takes the form of a rotary clutch for imparting the rotation of the planet carrier to the output shaft. The rotary clutch usually has a sealing ring between its relatively rotating parts, which sealing ring unavoidably gives rise to considerable oil leakage. The consequent accumulation of the oil in the pressure chamber has resulted in a delay in the engagement of the clutch in response to the delivery of the pressurized oil from the associated speed select valve.

SUMMARY OF THE INVENTION

Our invention improves the fluid operated transmission control system of the type under consideration and makes possible the manual actuation and deactuation of the drive establishing devices in the event of trouble in the means normally in use for their control. In attaining this objective, moreover, we also succeed in providing for the prevention of the double engagement of the drive speed establishing devices and of the drive direction establishing devices. We also provide for the quicker response of one of the drive establishing devices, preferably the one for the first speed.

Stated in brief, our invention provides a fluid operated transmission control system comprising first and second groups of drive establishing devices to be selectively actuated by fluid pressure for selecting a drive speed and a drive direction, respectively. The first group of devices are each associated with a speed select valve which is to be pilot operated for placing the associated device in communication with a pressurized fluid source and with a fluid drain. A direction select valve is provided for each of the second group of devices and is likewise pilot operated for placing the associated device in communication with the pressurized fluid source and with the fluid drain. The speed select valves are under the control of respective speed select control valves whereas the direction select valves are under the control of respective direction select control valves. The speed select control valves and direction select control valves are actuated electrically (or electromagnetically) in selected pairs for pilot operating the associated speed select valves and direction select valves, causing the same to direct the pressurized fluid to the desired speed and direction establishing devices. Also included are emergency control valves which are each capable of direct manual actuation and which are connected one between each of the speed select control valves and direction select control valves and the associated one of the speed select valves and direction select valves.

Thus, upon malfunctioning of any of the speed select control valves and direction select control valves, the associated emergency control valve may be hand operated to actaute or deactuate the desired drive speed or direction establishing device. The vehicle can therefore readily retract away from the cliff or other hazardous location even if one or more of the electrically actuated control valves fail to operate the drive establishing devices for some trouble or other.

Preferably, as in the embodiment of our invention disclosed herein, the speed select valves are interconnected in series, and the direction select valves are interconnected in parallel, with respect to the pressurized fluid source. One of the speed select valves is further adapted to normally deliver to the associated drive establishing device, preferably the first speed establishing device in the form of a rotary clutch, a relatively low fluid pressure less than the pressure at which the device becomes engaged. This device can therefore be readily engaged upon pilot actuation of the first speed select valve to its open position. Still further, upon pilot actuation of each of the other speed select valves, the first speed establishing device is placed in communication with the fluid drain through the actuated speed select valve, so that the fluid normally applied under relatively low pressure to the first speed establishing device is drained during the pressurization of the other speed establishing devices. We have thus avoided the simultaneous engagement of the first speed establishing device with the other speed establishing devices.

An additional feature of our invention resides in the connection of the pair of direction select valves with respect to the devices that determine respectively the forward and reverse drive directions through the transmission. The forward and reverse direction select valves are connected as aforesaid in parallel with each other. Further, when pilot operated to actuate the associated forward or reverse direction establishing device, either of the direction select valves places the other direction establishing device in communication with the fluid drain. There is accordingly no possibility of the accidental pressurization of both direction establishing devices at one and the same time.

The above and other features and advantages of our invention and the manner of realizing them will become more apparent, and the invention itself will best be understood, from a study of the following description and appended claims, with reference had to the attached drawing showing a preferable embodiment of our invention.

BRIEF DESCRIPTION OF THE DRAWING

The accompanying Drawing is a schematic diagram of the hydraulic transmission control system embodying the principles of our invention.

DESCRIPTION OF THE PREFERRED EMBODIMENT

We will now describe our invention in detail as embodied in the illustrated hydraulic vehicle transmission control system providing for three speeds in a forward direction and three speeds in a reverse direction. We have shown in the attached Drawing the control system 10 adapted to control the automatic transmission of the known construction having a plurality of fluid pressure actuated drive establishing devices 12 herein shown as hydraulic clutches. The drive establishing devices of this particular embodiment comprises three drive speed establishing devices 12-1, 12-2 and 12-3, and two drive direction establishing devices 12-F and 12-R. As the names imply, the drive speed establishing devices 12-1 through 12-3 determine the speed ratio through the transmission, whereas the drive direction establishing devices 12-F and 12-R determine the drive direction through the transmission. For the convenience of description we will hereinafter refer to the drive speed establishing devices 12-1 through 12-3 as the speed clutches, and to the drive direction establishing devices 12-F and 12-R as the direction clutches.

The pressurization of one of the speed clutches 12-1 through 12-3 realizes the associated speed ratio. The pressurization of either of the direction clutches 12-F and 12-R determines whether the drive to the vehicle wheels is in the forward or reverse direction. Thus, for a vehicle drive, one of the speed clutches and one of the direction clutches must be pressurized at one time in selected combinations.

Employed for the fluid pressure actuation of the above speed and direction clutches is a pump 14 which is driven by the vehicle engine, not shown, and which draws fluid, preferably oil, from a reservoir 16. The outlet 18 of the pump 14 communicates with various standard vehicle components operating hydraulically, in addition to the transmission control system 10. We will give no detailed discussion of such additional hydraulic components as they fall outside the purview of our invention.

The outlet 18 of the pump 14 leads to the main supply conduit 20 of the transmission control system 10 via a priority valve 22, modulation valve 24, and quick return valve 26. The main supply conduit 20 communicates with a group of pilot operated, two position shift valves generally designated 28. The shift valve group 28 of this embodiment comprises a series connection of three speed select valves 28-1, 28-2 and 28-3, and a parallel connection of two direction select valves 28-F and 28-R. The speed select valves 28-1 through 28-3 function to selectively place the respective speed clutches 12-1 through 12-3 in communication with the pump 14 and with the fluid drain. The direction select valves 28-F and 28-R function to selectively place the respective direction clutches 12-F and 12-R in communication with the pump 14 and with the fluid drain.

The first speed clutch 12-1 of the illustrated embodiment is a rotary clutch, which as currently constructed is subject to considerable oil leakage. We consider it desirable to normally deliver to this first speed clutch the fluid at a pressure less than the pressure at which it becomes engaged. Toward this end we provide a branch supply conduit 30 branching from the main supply conduit 20 and leading to the first speed select valve 28-1 via a pressure reducing valve 32. The first speed select valve 28-1 has the following two positions:

1. A left hand or normal position for communicating the main supply conduit 20 with a conduit 34 leading to the second speed select valve 28-2, and communicating the branch supply conduit 30 with the first speed clutch 12-1 via a flow restriction 36.

2. A right hand position for blocking the main supply conduit 20, communicating the branch supply conduit 30 with the first speed clutch 12-1 via an unrestricted path as well as via the restriction 36, and communicating the conduit 34 with the fluid drain.

The conduit 38 extending between first speed clutch 12-1 and first speed select valve 28-1 has a branch 40 leading to the second and third speed select valves 28-2 and 28-3. This branch conduit 40 is intended to place the first speed clutch 12-1 in communication with the fluid drain during the pressurization of the second and third speed clutches 12-2 and 12-3, as more fully set forth hereafter.

The second speed select valve 28-2 has the following two positions:

1. A left hand or normal position for communicating the conduit 34 with a conduit 42 leading to the third speed select valve 28-3, communicating the second speed clutch 12-2 with the fluid drain, and blocking the conduit 40 which is in communication with the first speed clutch 12-1.

2. A right hand position for communicating the second speed clutch 12-2 with the pump 14 by way of the conduit 34 and first speed select valve 28-1, and communicating both conduits 40 and 42 with the fluid drain.

The two positions of the third speed select valve 28-3 are:

1. A left hand or normal position for blocking both conduits 40 and 42 and communicating the third speed clutch 12-3 with the fluid drain.

2. A right hand position for communicating the third speed clutch 12-3 with the pump 14 by way of the conduits 34 and 42 and first and second speed select valves 28-1 and 28-2, and communicating the conduit 40 with the fluid drain.

It will have been seen from the foregoing description of the three speed select valves 28-1 through 28-3 that upon actuation of either of the second and third speed select valves with the consequent engagement of either the second or third speed clutches 12-2 or 12-3, the rotary first speed clutch 12-1 is placed in communication with the fluid drain through the actuated second or third speed select valve. The low fluid pressure normally applied to the first speed clutch is therefore drained upon engagement of the second or third speed clutch.

The parallel connection of the two direction select valves 28-F and 28-R are also well calculated to prevent the simultaneous engagement of both direction clutches 12-F and 12-R. We provide toward this end a conduit 44 branching from a conduit 46 extending between reverse direction clutch 12-R and reverse direction select valve 28-R. The branch conduit 44 communicates the reverse direction clutch 12-R with the forward direction select valve 28-F. The forward direction select valve 28-F has the following two positions:

1. A left hand or normal position for communicating the forward direction clutch 12-F with the fluid drain by way of a conduit 48, and blocking both main supply conduit 20 and branch conduit 44.

2. A right hand position for communicating the forward direction clutch 12-F with the pump 14 by way of the conduits 20 and 48, and communicating the reverse direction clutch 12-R with the fluid drain by way of the conduit 44.

The reverse direction select valve 28-R has the following two positions:

1. A left hand or normal position for communicating the reverse direction clutch 12-R with the fluid drain.

2. A right hand position for communicating the reverse direction clutch 12-R with the pump 14 by way of the conduits 20 and 46.

Thus, when actuated leftward to engage the forward direction clutch 12-F, the forward direction select valve 28-F places the reverse direction clutch 12-R in communication with the fluid drain. We have thus avoided the simultaneous engagement of both direction clutches 12-F and 12-R.

The above speed and direction select valves 28 are all pilot operated, each receiving pilot pressures at its opposite ends. A pilot conduit 50 having a pressure reducing valve 52 conveys part of the pressurized output fluid of the pump 14 directly to the right hand end of each speed and direction select valve 28 and, via a restriction 54, to the left hand end of each valve 28. Each speed and direction select valve 28 is further provided with a spring 56 at its left hand end. The spring 56 coacts with the pilot pressure on the left hand end of each valve 28 to urge the same rightwardly against the pilot pressure on its right hand end and to normally hold the same in the left hand position. However, when the pilot pressure on the left hand end of each valve 28 is released, the right hand pilot pressure defeats the force of the spring 56 and shifts the valve leftwardly.

Provided for pilot operating the speed and direction select valves 28-1 through 28-3 and 28-F and 28-R, are three speed select control valves 58-1, 58-2 and 58-3, associated one with each speed select valve, and two direction select control valves 58-F and 58-R associated with the respective direction select valves. These control valves 58 are each in the form of an on-off valve actuated electrically or electromagnetically. We recommend the use of familiar solenoid valves, as shown, as the control valves 58. Normally held closed, each control valve 58 opens on actuation to drain the pilot pressure acting on the left hand end of the associated speed or direction select valve 28. Consequently, upon actuation of one of the three speed select control valves 58-1 through 58-3 and either of the direction select control valves 58-F and 58-R, the associated ones of the speed and direction select valves 28 are pilot operated to their right hand positions to cause engagement of the associated ones of the speed and direction clutches 12.

A further feature of our invention resides in a series of emergency control valves 60 connected one between each control valve 58 and the associated one of the speed and direction select valves 28. In this particular embodiment the emergency control valves 60 comprise three emergency speed control valves 60-1, 60-2 and 60-3 and two emergency direction control valves 60-F and 60-R. Each emergency control valve 60 is to be hand operated by the vehicle operator in the event of the malfunctioning of the associated solenoid valve 58. It has the following three positions:

1. A neutral position for communicating the left hand pilot port of the associated speed or direction select valve 28 with the associated speed or direction select control valve 58.

2. A right hand offset position for communicating the left hand pilot port of the associated valve 28 with the fluid drain.

3. A left hand offset position for blocking the left hand pilot port of the associated valve 28.

The emergency control valves 60 are to be held in neutral as long as the speed and direction select control valves 58 are operating properly. The speed and direction select valves 28 will then be pilot operated by the respective speed and direction select control valves 58. If any of the speed and direction select control valves 58 becomes unactuable to its open position, as by reason of some trouble in the electric system, then the associated emergency control valve 60 may be hand operated from its neutral to right hand position. The left hand pilot pressure of the associated speed or direction select valve 28 will then communicate with the fluid drain, allowing the valve to shift to its right hand position. Should any of the speed and direction select control valves 58 be locked in its open position by some accident, on the other hand, then the associated emergency control valve 60 may be hand operated to its left hand position to terminate the drainage of the pilot fluid through the malfunctioning valve 58. The associated speed or direction select valve 28 will then return to its normal left hand position.

OPERATION

We will now proceed to the operational description of the above transmission control system, first with regard to the shifting of the transmission. When all the speed and direction select control valves 58 are held unactuated, the speed and direction select valves 28 remain in their left hand position under the bias of the springs 56. The second and third speed clutches 12-2 and 12-3 and both direction clutches 12-F and 12-R are then all placed in communication with the fluid drain. The rotary first speed clutch 12-1, however, receives via the first speed select valve 28-1 the fluid pressurized to such an extent as not to cause engagement thereof. This low fluid pressure is intended to improve the response of the first speed clutch 12-1.

The vehicle can be started, either in the forward or reverse direction, as the first speed clutch 12-1 and either the forward or reverse direction clutch 12-F or 12-R are both engaged. This requires the actuation of the first speed select control valve 58-1 and of either the forward or reverse direction select control valve 58-F or 58-R. Solenoid actuated, these control valves 58-1 and 58-F or 58-R will drain the pilot pressures that have been acting on the left hand ends of the first speed select valve 28-1 and either the forward or reverse direction select valve 28-F or 28-R, thereby causing the speed and direction select valves to shift to their right hand positions under the pilot pressures acting on their right hand ends and against the bias of the springs 56. The first speed select valve 28-1 will then direct the pressurized fluid from the pump 14 toward the first speed clutch 12-1 by way of the conduit 30, whereas the forward or reverse direction select valve 28-F or 28-R will direct the pressurized fluid toward the forward or reverse direction clutch 12-F or 12-R by way of the conduit 20. Thereupon the vehicle will start up at the first speed ratio, either forwardly or rearwardly.

In the case of forward vehicle travel, with the forwrad direction select valve 28-F shifted to the left to engage the forward direction clutch 12-F engaged, the reverse direction clutch 12-R communicates with the fluid drain by way of the conduit 44 and valve 28-F. This precludes the possibility of the reverse direction clutch 12-R becoming engaged accidentally during the engagement of the forward direction clutch 12-F.

With the subsequent energization of the second and third speed select control valves 58-2 and 58-3 one after the other, the second and third speed select valves 28-2 and 28-3 become subsequently pilot operated to direct the pressurized fluid from the pump 14 toward the second and third speed clutches 12-2 and 12-3. The vehicle will thus travel at the second, and then at the third, speed ratio. Either of the second and third speed select valves 28-2 and 28-3 on actuation places the first speed clutch 12-1 in communication with the fluid drain. Consequently the first speed clutch is not to be engaged accidentally during the engagement of the second or third speed clutch. Even though the first speed select valve 28-1 is then in its normal position, allowing the passage of the pressurized fluid therethrough from conduit 30 to conduit 38 via the restriction 36, this fluid does not pressurize the first speed clutch 12-1 but is drained through either of the second and third speed select valves being actuated.

The solenoid operated speed and direction select control valves 58 are susceptible to malfunctioning as aforesaid. Assume that the reverse direction select control valve 58-R has become unactuable, making it impossible for the vehicle to back away from the edge of a cliff, for example, by the normal procedure. In that case the vehicle operator may hand operate the emergency direction control valve 60-R and shift the same to its right hand position, causing the drainage of the pilot fluid that has been acting on the left hand end of the reverse direction select valve 28-R. Thus pilot operated, the reverse direction select valve 28-R will direct the pressurizied fluid from the pump 14 toward the reverse direction clutch 12-R. Upon engagement of this reverse direction clutch the first speed clutch 12-1 may be engaged to cause rearward travel of the vehicle away from the cliff or other obstacle. The reverse direction clutch 12-R can of course be disengaged as the emergency control valve 60-R is again hand operated to cause the reapplication of the pilot pressure on the left hand end of the reverse direction select valve 28-R.

When trouble occurs with any of the other solenoid valves 58-1 through 58-3 and 58-F, the associated emergency control valve 60 may be likewise hand activated to pilot operate the associated speed or direction select valve 28. Thus the travel of the vehicle in either direction at any speed ratio is possible in the face of the malfunctioning of any one or more of the solenoid valves 58-1 through 58-3 and 58-F and 58-R.

While we have shown and described our invention in terms of but one embodiment thereof, we recognize that our invention could be embodied in other forms without departing from its scope, which is not intended to be limited except as expressed in the following claims.

We claim:

1. A fluid operated transmission control system comprising:
   (a) a source of fluid under pressure;
   (b) a first group of fluid actuated drive establishing devices to be selectively actuated by the pressurized fluid from the source for selecting a drive speed;
   (c) a second group of fluid actuated drive establishing devices to be selectively actuated by the pressurized fluid from the source for selecting a drive direction;
   (d) a plurality of speed select valves, associated one with each of the first group of drive establishing devices, to be pilot operated individually for directing the pressurized fluid from the source to the associated ones of the first group of drive establishing devices;
   (e) a plurality of direction select valves, associated one with each of the second group of drive establishing devices, to be pilot operated individually for directing the pressurized fluid from the source to the associated ones of the second group of drive establishing devices;
   (f) a plurality of speed select control valves, associated one with each speed select valve, to be electrically actuated individually for pilot operating the associated speed select valves to cause the same to direct the pressurized fluid to the associated ones of the first group of drive establishing devices;
   (g) a plurality of direction select control valves, associated one with each direction select valve, to be electrically actuated individually for pilot operating the associated direction select valves to cause the same to direct the pressurized fluid to the associated ones of the second group of drive establishing devices; and
   (h) a plurality of emergency control valves interposed one between each of the speed select control valves and direction select control valves and the associated one of the speed select valves and direction select valves, each emergency control valve being operated manually upon malfunctioning of the associated one of the speed select control valves and direction select control valves to actuate or deactuate the associated one of the first and second groups of drive establishing devices via the associated one of the speed select valves and direction select valves.

2. The fluid operated transmission control system of claim 1 wherein the speed select valves are interconnected in series with respect to the pressurized fluid source, and wherein the direction select valves are interconnected in parallel with respect to the pressurized fluid source.

3. The fluid operated transmission control system of claim 1 wherein all but one of the speed select valves are each adapted to place, when pilot operated to actuate the associated drive establishing device, in communication with a fluid drain the drive establishing device associated with said one speed select valve.

4. The fluid operated transmission control system of claim 1 wherein one of the first group of drive establishing devices normally receives via the associated speed select valve a relatively low fluid pressure less than a pressure at which the device becomes actuated.

5. The fluid operated transmission control system of claim 4 wherein each of the other speed select valves when pilot operated to actuate the associated one of the first group of drive establishing devices is effective to place said one of the first group of drive establishing devices in communication with a fluid drain, whereby the delivery of the low fluid pressure to said one drive establishing device is suspended during the actuation of the others of the first group of drive establishing devices.

6. The fluid operated transmission control system of claim 1 wherein the second group of drive establishing devices comprise a forward drive establishing device and a reverse drive establishing device, wherein the direction select valves comprise a forward direction select valve and a reverse direction select valve associated respectively with the forward drive establishing device and the reverse drive establishing device, and wherein either of the forward direction select valve and reverse direction select valve is adapted to place, when pilot operated to actuate the associated one of the forward drive establishing device and reverse drive establishing device, the other of the forward drive establishing device and reverse drive establishing device in communication with a fluid drain.

7. A fluid operated transmission control system comprising:
 (a) a source of fluid under pressure;
 (b) a plurality of drive speed establishing devices including a rotary first speed clutch and all adapted to be selectively actuated by the pressurized fluid from the source for selecting a drive speed;
 (c) a pair of drive direction establishing devices adapted to be selectively actuated by the pressurized fluid from the source for selecting a drive direction;
 (d) a series connection of speed select valves associated one with each drive speed establishing device and adapted to be pilot operated individually for directing the pressurized fluid from the source to the associated ones of the drive speed establishing devices, the speed select valves including a first speed select valve associated with the first speed clutch, the first speed select valve being adapted to normally deliver to the first speed clutch a relatively low fluid pressure less than a pressure at which the first speed clutch becomes engaged;
 (e) a pair of direction select valves connected in parallel with each other and associated one with each drive direction establishing device, each direction select valve being adapted to be pilot operated for directing the pressurized fluid from the source to the associated one of the drive direction establishing devices, one of the direction select valves being adapted to place, when pilot operated to actuate the associated one of the drive direction establishing devices, the other drive direction establishing device in communication with a fluid drain;
 (f) a plurality of speed select control valves, associated one with each speed select valve, to be electrically actuated individually for pilot operating the associated speed select valves to cause the same to direct the pressurized fluid to the associated drive speed establishing devices;
 (g) a pair of direction select control valves, associated one with each direction select valve, to be electrically actuated individually for pilot operating the associated direction select valves to cause the same to direct the pressurized fluid to the associated drive direction establishing devices; and
 (h) a plurality of emergency control valves connected one between each of the speed select control valves and direction select control valves and the associated one of the speed select valves and direction select valves, each emergency control valve being adapted to be operated manually upon malfunctioning of the associated one of the speed select control valves and direction select control valves to actuate or deactuate the associated one of the drive speed establishing devices and drive direction establishing devices via the associated one of the speed select valves and direction select valves.

8. The fluid operated transmission control system of claim 7 wherein each speed select valve other than the first speed select valve is adapted to place, when pilot operated to actuate the associated one of the drive speed establishing devices, the first speed clutch in communication with the fluid drain, whereby delivery of the low fluid pressure in the first speed clutch is suspended during the delivery of the pressurized fluid to the other drive speed establishing devices.

* * * * *